United States Patent [19]

Inagaki et al.

[11] Patent Number: 4,793,651

[45] Date of Patent: Dec. 27, 1988

[54] HEAT-RETAINING AIR-FILLED SEAT COVER FOR LUMBAR SUPPORT

[75] Inventors: Akio Inagaki, Okazaki; Chiaki Yamada, Nishio; Tamio Ohi, Okazaki; Marehito Kato, Toyota; Minoru Hirata, Chiryu, all of Japan

[73] Assignee: Aisin Seiki Kabushiki Kaisha, Kariya, Japan

[21] Appl. No.: 333,054

[22] Filed: Dec. 21, 1981

[30] Foreign Application Priority Data

Dec. 22, 1980 [JP] Japan ............................ 55-184365[U]

[51] Int. Cl.⁴ ............................................. A47C 27/08
[52] U.S. Cl. ...................................... 297/180; 5/450; 297/229; 297/284; 297/DIG. 3
[58] Field of Search ............... 297/180, 284, 219, 229, 297/DIG. 3; 5/441, 449–456

[56] References Cited

U.S. PATENT DOCUMENTS

| | | | |
|---|---|---|---|
| 2,731,652 | 1/1956 | Bishop | 297/DIG. 3 |
| 3,259,925 | 7/1966 | Tilles | 297/219 X |
| 3,278,226 | 10/1966 | Magnusson | 297/219 |
| 3,326,601 | 6/1967 | Vanderbilt . | |
| 3,678,520 | 7/1972 | Evans | 297/284 X |
| 4,108,492 | 8/1978 | Kirby . | |
| 4,175,297 | 11/1979 | Robbins et al. | 297/180 |

FOREIGN PATENT DOCUMENTS

| | | | |
|---|---|---|---|
| 1405778 | 11/1968 | Fed. Rep. of Germany | 297/DIG. 3 |
| 1296761 | 6/1969 | Fed. Rep. of Germany | 297/284 |
| 2636314 | 9/1977 | Fed. Rep. of Germany | 297/DIG. 3 |

*Primary Examiner*—Peter R. Brown
*Attorney, Agent, or Firm*—Finnegan, Henderson, Farabow, Garrett & Dunner

[57] ABSTRACT

A seat cover for an automotive vehicle which has inflatable, transversely extending columnar portions for providing support to the seated individual, especially to the lumbar region, and heat-retaining portions, filled with a heat-retaining agent such as polyethylene glycol, interspersed among the inflatable columnar portions for accumulating ambient heat derived from sunlight and for giving off said heat when the ambient temperature drops. Means for inflating the columnar portions manually are provided.

3 Claims, 2 Drawing Sheets

FIG. 1A
FIG. 1B
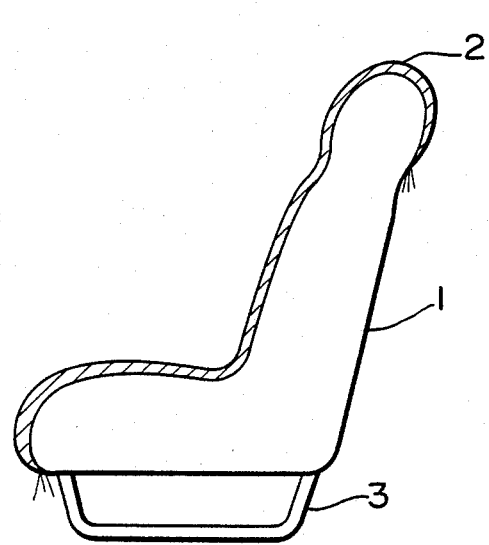
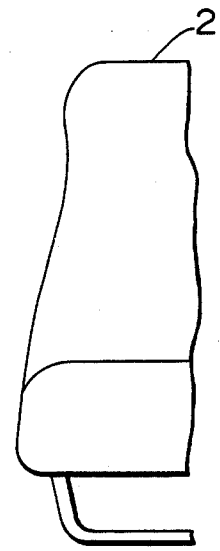
FIG. 2A
FIG. 2B
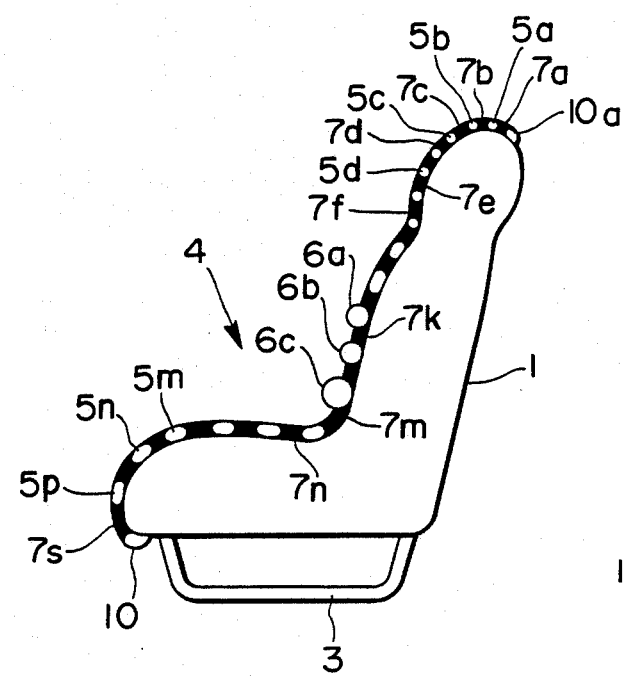
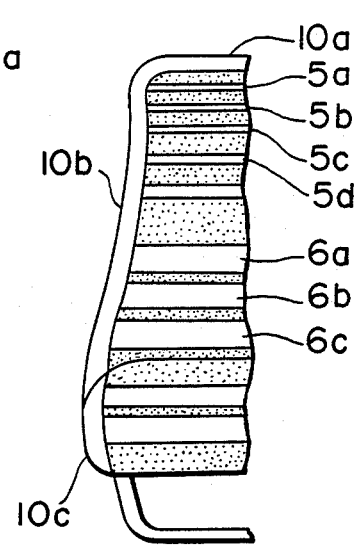

HEAT-RETAINING AIR-FILLED SEAT COVER FOR LUMBAR SUPPORT

BACKGROUND OF THE INVENTION

1. Field of the Invention

This invention relates to improvements in a seat cover for use in automotive vehicles. More particularly, the invention relates to an automotive vehicle seat cover which makes use of air-filled chambers for providing support for the lumbar region of the driver and passengers, and heat-retaining portions for giving off heat accumulated during the day.

2. Description of the Prior Art

Individuals who drive or ride in automotive vehicles during the winter months have often experienced the unpleasant sensation of sitting down in the driver or passengers seat when the surface whereof is extremely cold. To alleviate such driver and passengers discomfort, it is conventional practice to attach a seat cover made of a mixture of wool and other fibers to the surface of the seat to provide a warmer surface. While such an arrangement represents an improvement over the bare vehicle seat, the expedient is essentially a passive one which does not effectively exploit whatever ambient heat is available in the passenger compartment of the vehicle during the day, as when the vehicle is left parked in an area exposed to direct sunlight.

Another requirement demanded of a vehicle seat is firm support for the lumbar region of the driver and passengers, an especially important requirement for long journeys. Although many designs have been adopted for this purpose and have provided a partial solution, some means for freely adjusting the lumbar supporting contour to fit the individual posture or frame of the driver or passenger is needed.

SUMMARY OF THE INVENTION

Accordingly, an object of the present invention is to provide a seat cover, for use in automotive vehicles, which makes active use of thermal energy from the sun by accumulating solar heat and retaining such heat for an extended period of time even after the ambient temperature drops, thereby providing a comfortable riding environment for the driver and passengers in the winter and in normally cold climates.

Another object of the present invention is to provide a seat cover which makes use of air-filled columnar chambers formed in the seat cover face to provide lumbar support for less driver and passengers fatigue, particularly during extended periods of driving.

Still another object of the present invention is to provide a seat cover in which the lumbar supporting structure can be simply adjusted by the driver or passengers to fit his particular posture or frame.

According to the present invention, these ends are achieved by providing a seat cover comprising a pliable synthetic resin sheet member which is impermeable to air for being attached to the front surface of a vehicle seat, a plurality of first inflatable columnar portions formed in the sheetmmember transversely thereof and spaced apart longitudinally thereof, a plurality of second inflatable columnar portions, larger in diameter than the first inflatable columnar portions, formed in the sheet member transversely thereof and so spaced longitudinally thereof as to be positioned at the lumbar region of an individual seated in the seat, a third inflatable portion formed in the sheet member for interconnecting the first and second inflatable columnar portions, means communicating with the third inflatable portion for inflating the third inflatable portion as well as the first and second columnar inflatable portions, and a plurality of heat-retaining portions each formed in the sheet member transversely thereof between adjacent ones of the first and second inflatable columnar portions.

These and other objects and features of the present invention will be apparent from the following description taken in conjunction with the accompanying drawings, in which like reference characters designate the same or similar parts throughout the figures thereof.

BRIEF DESCRIPTION OF THE DRAWINGS

FIG. 1A is a side view of a seat cover according to the prior art;

FIG. 1B is a front view of the left-hand side of the seat cover shown in FIG. 1A;

FIG. 2A is a sectional view of a seat cover according to the present invention;

FIG. 2B is a front view of the left-hand side of the seat cover shown in FIG. 2A.

DESCRIPTION OF THE PREFERRED EMBODIMENT

Figure 3:
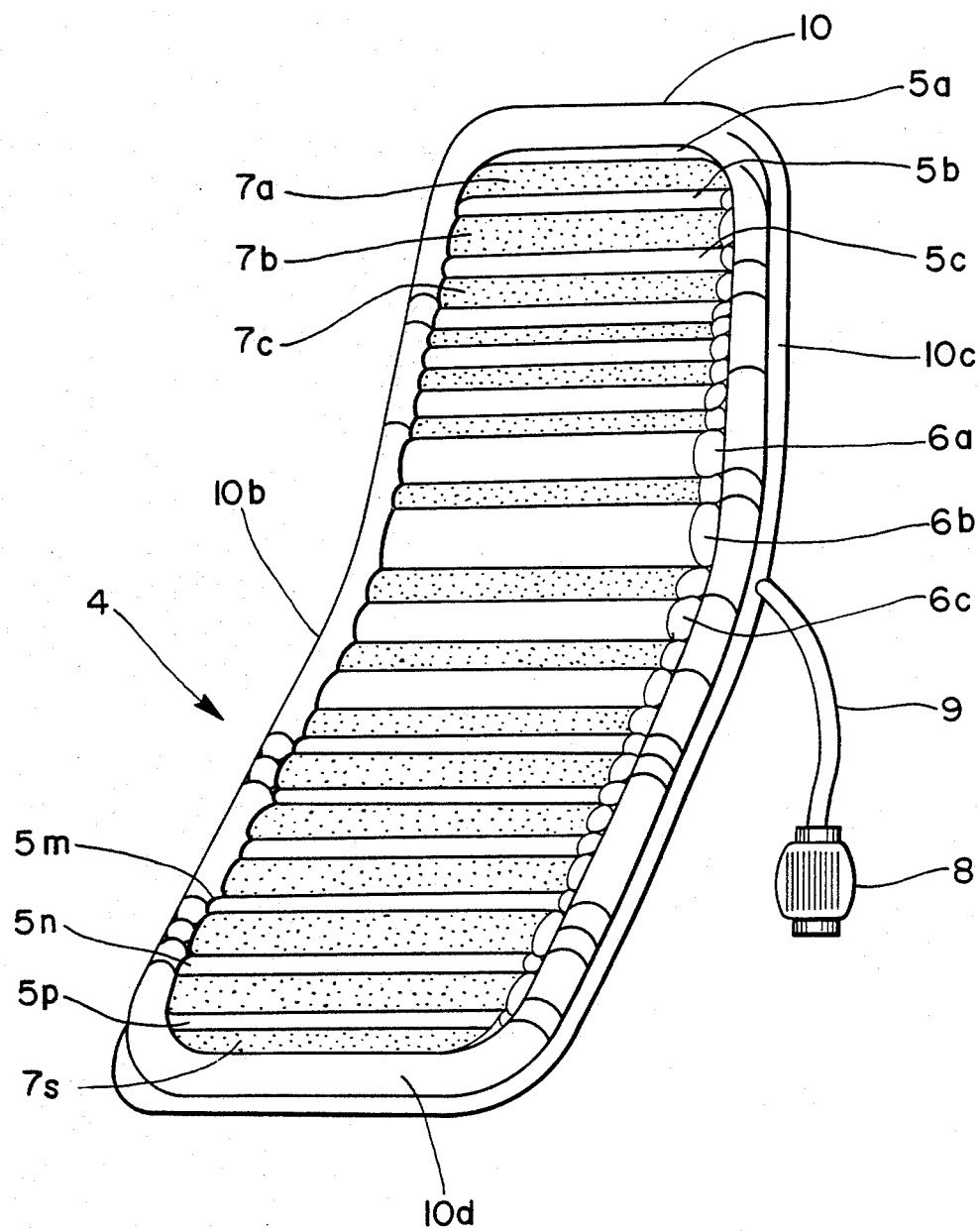
FIG. 3 is a perspective view of the seat cover according to the present invention.

Before proceeding with a detailed description of the preferred embodiment, reference will be had briefly to FIG. 1 which shows a seat cover according to the prior art. Here a seat 1, affixed to the floor of the vehicle by a fixture 3, has its surface covered by a conventional seat cover 2 consisting of a mixture of wool and other fibers to provide a surface which is warmer than the surface of the bare seat in winter.

FIGS. 2 and 3 illustrate the seat cover according to a preferred embodiment of the present invention. The seat cover, indicated generally at numeral 4, consists of a soft, pliable synthetic resin sheet or of a synthetic resin sheet stretched and affixed to a fabric. The resin is so formed as to be impermeable to air, assuring an air-tight structure. The seat cover 4, attached in a conventional manner to the entire front surface of the seat 1, is formed in such a manner that the sheet includes suitably spaced-apart transversely extending air-tight compartments 5a through 5p defining inflatable portions which are substantially columnar in shape, transversely extending air-tight compartments 6a through 6c for lumbar support, these also defining inflatable portions which are columnar in shape but larger in diameter that the compartments 5a through 5p and so disposed as to abut against the lumbar region of the seated individual when the seat cover 4 is attached to the seat 1, transversely extending heat-retaining portions 7a through 7s, each disposed between, adjacent ones of the air-tight compartments 5a through 5p and 6a through 6c, and filled with a heat-retaining agent which will be described in more detail hereinbelow, and an air-tight border compartment 10 comprising interconnected transversely extending portions 10a, 10d and longitudinally extending portions 10b, 10c. Furthermore, the seat cover 4 is formed in such a manner that the air-tight compartments 5a through 5p, 6a through 6c and 10 are interconnected to define a unitary hollow body capable of being inflated with air. This is accomplished by providing a manually operated air pump 8, shown in FIG. 3, communicating with the border compartment 10 through a flexible hose 9. Thus, pumping air through the hose 9 by manually squeezing the pump 8 permits the seated individual to inflate the interconnected air-tight compartments mentioned above so that these compartments, particularly the lumbar supporting compartments 6a through 6c, may be inflated to exactly fit the contour of the seated individual, especially his lumbar region. The inflating operation can be performed by the driver with facility even while he is operating the vehicle.

The heat-retaining agent referred to above may be a material such as polyethylene glycol or soda of acetic acid. Polyethylene glycol is especially preferred as it assumes a liquid state at temperatures of 35° to 40° C. or above, and changes from a soft pliable state to a solid or powdery state at temperatures lower than that stated, depending upon the temperature drop, i.e., upon the amount of heat given off. The heat-retaining agent, as best shown in FIG. 2, is packed into the superficial area of the heat-retaining portions 7a through 7s of the seat cover 4, as indicated by the black regions in the sectional view 2A and by the dotted regions in the front view 2B and the perspective view 3.

In accordance with the above arrangement, the heat-retaining agent, which is packed in the inventive seat cover attached to a vehicle seat in winter, rises in temperature as it absorbs the solar heat that builds up in the passenger compartment of the vehicle when it is parked during the daytime in the sunny area of a parking lot or at any location having good exposure to sunlight. When contact with sunlight is lost, or when the sun sets, the heat-retaining agent retains the accumulated thermal energy for several hours, giving off the heat slowly over said period of time to give the seated individual a very comfortable ride even after the ambient temperature within the passenger compartment drops because of the winter weather prevailing outside. Meanwhile, introducing air into the air-tight compartments by operating the air pump allows the seated individual to form columnar bulges in the surface of the seat cover to fit the surface exactly to his posture. In particular, the lumbar-supporting compartments 6a through 6c when inflated in this fashion reduce driver fatigue that might otherwise occur over an extended driving period.

Thus, as described and illustrated above, the heat-retaining add air-filled lumbar-supporting seat cover of the present invention is possessed of a simple construction which makes active use of thermal energy derived from sunlight to store heat in a heat-retaining agent which gives off heat when the ambient temperature falls. By exploiting this heat-accumulating and heat-radiating action and the heat-retaining effect of the invention, the seat can be kept warm for several hours even after a drop in the temperature inside and outside the passenger compartment of the vehicle. Moreover, the air-filled compartments also contribute to a comfortable ride, particularly those compartments disposed to support the lumbar region of the seated individual. Such an arrangement greatly reduces driver fatigue.

As many apparently widely different embodiments of the present invention may be made without departing from the spirit and scope thereof, it is to be understood that the invention is not limited to the specific embodiments thereof except as defined in the appended claims.

What we claim is:

1. A seat cover for attachment to a seat in an automotive vehicle, which seat cover comprises:
   a pliable synthetic resin sheet member which is impermeable to air for being attached to the entire front surface of the seat;
   a plurality of air-tight first inflatable columnar portions formed in said sheet member transversely thereof and spaced apart longitudinally thereof;
   a plurality of air-tight second inflatable columnar portions, larger in diameter than said first inflatable columnar portions, formed in said sheet member transversely thereof and so spaced longitudinally thereof as to be positioned at the lumbar region of an individual seated in said automobile seat when the seat cover is attached to said seat;
   a third air-tight inflatable portion formed in said sheet member and interconnecting said first and second inflatable columnar portions so that said first, second and third inflatable portions form a unitary body capable of being inflated with air;
   inflation means communicating with said third inflatable portion for inflating said third inflatable portion as well as said first and second inflatable columnar portions; and
   a plurality of heat-retaining portions each formed in said sheet member transversely thereof between adjacent ones of said first and second inflatable columnar portions, each heat-retaining portion containing a heat-retaining agent capable of absorbing solar heat and retaining the accumulated solar thermal energy for several hours, said heat-retaining agent being selected from the group consisting of polyethylene glycol and soda of acetic acid, whereby the first, second and third inflatable portions may be inflated to fit the contour of the individual and the seat will keep warm for several hours, even after a drop in the ambient temperature.

2. A seat cover for attachment to a seat in an automotive vehicle, which seat cover comprises:
   a pliable synthetic resin sheet member which is impermeable to air for being attached to the entire front surface of the seat;
   a plurality of air-tight first inflatable columnar portions formed in said sheet member transversely thereof and spaced apart longitudinally thereof;
   a plurality of air-tight second inflatable columnar portions, larger in diameter than said first inflatable columnar portions, formed in said sheet member transversely thereof and so spaced longitudinally thereof as to be positioned at the lumbar region of an individual seated in said automobile seat when the seat cover is attached to said seat;
   a third air-tight inflatable portion formed in said sheet member and interconnecting said first and second inflatable columnar portions so that said first, second and third inflatable portions form a unitary body capable of being inflated with air;
   inflation means communicating with said third inflatable portion for inflating said third inflatable portion as well as said first and second inflatable columnar portions; and
   a plurality of heat-retaining portions each formed in said sheet member transversely thereof between adjacent ones of said first and second inflatable columnar portions, each heat-retaining portion containing a heat-retaining agent capable of absorbing solar heat and retaining the accumulated solar thermal energy for several hours, said heat-retaining agent assuming a liquid state at temperatures of 35° to 40° C. or above, whereby the first, second and third inflatable portions may be inflated to fit the contour of the individual and the seat will keep warm for several hours, even after a drop in the ambient temperature.

3. A seat cover for attachment to a seat in an automotive vehicle, which seat cover comprises:
- a pliable synthetic resin sheet member which is impermeable to air for being attached to the entire front surface of the seat;
- a plurality of air-tight first inflatable columnar portions formed in said sheet member transversely thereof and spaced apart longitudinally thereof;
- a plurality of air-tight second inflatable columnar portions, larger in diameter than said first inflatable columnar portions, formed in said sheet member transversely thereof and so spaced longitudinally thereof as to be positioned at the lumbar region of an individual seated in said automobile seat when the seat cover is attached to said seat, some of said first inflatable columnar portions being positioned above said second inflatable columnar portions and some of said first inflatable columnar portions;
- a third air-tight inflatable portion formed in said sheet member and interconnecting said first and second inflatable columnar portions so that said first, second and third inflatable portions form a unitary body capable of being inflated with air;
- inflation means communicating with said third inflatable portion for inflating said third inflatable portion as well as said first and second inflatable columnar portions; and
- a plurality of heat-retaining portions each formed in said sheet member transversely thereof between adjacent ones of said first and second inflatable columnar portions, each heat-retaining portion containing a heat-retaining agent capable of absorbing solar heat and retaining the accumulated solar thermal energy for several hours, said heat-retaining agent assuming a liquid state at temperatures of 35° to 40° C. or above, whereby the first, second and third inflatable portions may be inflated to fit the contour of the individual and the seat will keep warm for several hours, even after a drop in the ambient temperature.

* * * * *